United States Patent [19]

Arnold

[11] 4,004,258
[45] Jan. 18, 1977

[54] POSITION INDICATING PULSE LATCHING SOLENOID

[75] Inventor: Kurt Arnold, West Caldwell, N.J.

[73] Assignee: Valcor Engineering Corporation, Kenilworth, N.J.

[22] Filed: Nov. 20, 1974

[21] Appl. No.: 525,349

[52] U.S. Cl. .................................. 335/17; 335/79; 335/154

[51] Int. Cl.² ....................................... H01H 73/12

[58] Field of Search .......... 335/227, 229, 230, 234, 335/205, 258

[56] References Cited

UNITED STATES PATENTS

| | | | |
|---|---|---|---|
| 2,853,659 | 9/1958 | Herion | 335/258 X |
| 2,919,324 | 12/1959 | Schuessler | 335/84 X |
| 3,390,361 | 6/1968 | Bodge | 335/154 X |
| 3,568,008 | 3/1971 | Tanimura et al. | 335/151 X |
| 3,605,054 | 9/1971 | Conrath | 335/260 X |
| 3,792,390 | 2/1974 | Boyd | 335/234 X |
| 3,828,288 | 8/1974 | Boyd | 335/234 |

*Primary Examiner*—George Harris
*Attorney, Agent, or Firm*—Darby & Darby

[57] ABSTRACT

A position indicating pulse latching solenoid has a plunger of paramagnetic steel, movable between two stops of similar material, and fixed permanent magnets which impart a flux to the plunger causing it to adhere to the stop to which it is moved, movement being accomplished by a respective winding about each stop which when excited by an electrical pulse momentarily exerts an attractive force on the plunger. A reed switch senses the momentary flux generated by the excited winding at a leakage gap near one of the stops and also determines whether the flux imparted to the plunger by the permanent magnets has shifted with the plunger to or away from the gap to indicate plunger position.

10 Claims, 3 Drawing Figures

POSITION INDICATING PULSE LATCHING SOLENOID

BACKGROUND OF THE INVENTION

The use of solenoids to actuate mechanical devices, such as valves, upon application of electrical energy is well known. Conventional solenoids, wherein a plunger is moved from a deenergized position to an energized position, require continuous application of an electric current to the solenoid winding to maintain the plunger in the latter position. Furthermore, in order to return the plunger to its deenergized position upon termination of the electrical current, means for generating a restoring force such as springs must be employed. The use of such springs is disadvantageous in that they further increase the energy requirements of the solenoid requiring that sufficient electrical current be applied to the actuating coil to overcome the counterforces of the spring. Springs are also subject to corrosion and wear and subsequent mechanical failure.

To overcome these disadvantages, devices containing a magnetic latching feature have been developed. In these devices the plunger is held in position by the force of a permanent magnet and may be shuttled from one position to another by conventional mechanical forces or by application of electrical energy to an electromagnetic winding to create a magnetic force which counteracts and overcomes the permanent magnetic force holding the plunger in a given position. In such devices, the construction is often such that the magnetically responsive plunger is not visible to an observer of the apparatus in which it is employed.

In apparatus where a mechanical member, hidden from view, is to move from one position to another it is often desirable to verify such movement by some remote sensing means. The use of a permanent magnet and a reed switch, one mounted on the moving member and the other stationary is well known. In such configurations the magnet and reed switch are moved relative to one another, the reed switch closing when adjacent to the permanent magnet and opening when separated from it.

Instead of using permanent magnets to indicate a shift in position of a moving member, the prior art also teaches the use of an iron member, affixed to the moving member, situated within the region of the energizing coil so that the iron member is magnetized by the energized coil thereby serving a function similar to that of the permanent magnet when moved relative to an adjacent reed switch. This configuration while sometimes useful for position indication has several inherent disadvantages. First, the sensing reed switch must be adjacent to the moving magnetic member when the member is in one position and displaced from that member when it is moved to its alternate position. This places substantial structural limitations upon the solenoid mechanism. Furthermore, in order to verify movement of the plunger to a desired position, in a solenoid having a duty cycle during which the plunger alternates between positions, the indicator operated by the reed switch sensor must be observed at a time when the moving member is to be in the position to be sensed. The reed switch will not be actuated at all if the solenoid plunger fails to move as required, and unless the operator is aware that the solenoid winding effecting required plunger movement was energized, there is no way of determining system failure.

SUMMARY OF THE INVENTION

The present invention relates to magnetic latching solenoids wherein a sensor remote from the solenoid plunger determines plunger position. More specifically, the present invention employs two permanent magnetic circuits each containing a plunger stop and each of which is alternately opened and closed upon movement of a paramagnetic circuit-closing plunger from one stop to the other. Once the plunger is moved into one of the two magnetic circuits it is held in place by magnetic forces, developed between the plunger and the stop both of which are composed of paramagnetic material, resulting from a flux imparted by adjacent permanent magnets. No springs, mechanical members or gravity forces are required to hold the plunger in place. To move the plunger from one stop to another, only a brief electrical pulse need be applied to a winding in the magnetic circuit into which the plunger is to be moved. When the plunger moves to a stop in one magnetic circuit the other magnetic circuit is interrupted due to the gap left by the plunger. Thus the only substantial forces acting on the plunger in contact with one of the stops are those which maintain it in its instant position there being no substantial counterforces exerted on it until a pulse is applied to a winding in the other magnetic circuit sufficient to overcome the reluctance of the gap between the plunger and the other stop.

The position of the plunger is sensed by a magnetic reed switch adjacent to a flux leakage path provided in one of the magnetic circuits. The reed switch need not be adjacent to the moving plunger to sense its position. Furthermore, even if the plunger does not move upon command, application of a command pulse to one of the magnetic circuit windings will cause the switch to momentarily close during the transient build-up of flux in the corresponding magnetic circuit and then reopen after the electromagnetic flux field collapses thereby permitting a failure indication via appropriate logic circuitry.

It is therefore an object of the invention to provide a position indicating solenoid wherein plunger position may be sensed at a location remote from the plunger.

Another object of the invention is to provide a solenoid wherein plunger position is indicated by the presence or absence of a magnetic leakage flux.

Still another object of the invention is to provide a position indicating solenoid in which failure of the solenoid plunger to shift on automatic command may be determined without prior knowledge of the command.

A further object of the invention is to provide a position indicating solenoid wherein a single means senses both the switch actuation command and plunger position.

Other and further objects of the invention will be apparent from the following description and drawings of a preferred embodiment of the invention in which like reference numerals are used to indicate like parts.

DESCRIPTION OF THE DRAWINGS

In the accompanying drawings which are a part of the instant specification and are to be read in conjunction therewith:

FIG. 1A is a fragmented sectional elevation of the embodiment of FIG. 1 in changed state and with additional sensing means.

DESCRIPTION OF THE PREFERRED EMBODIMENT

Figure 1:
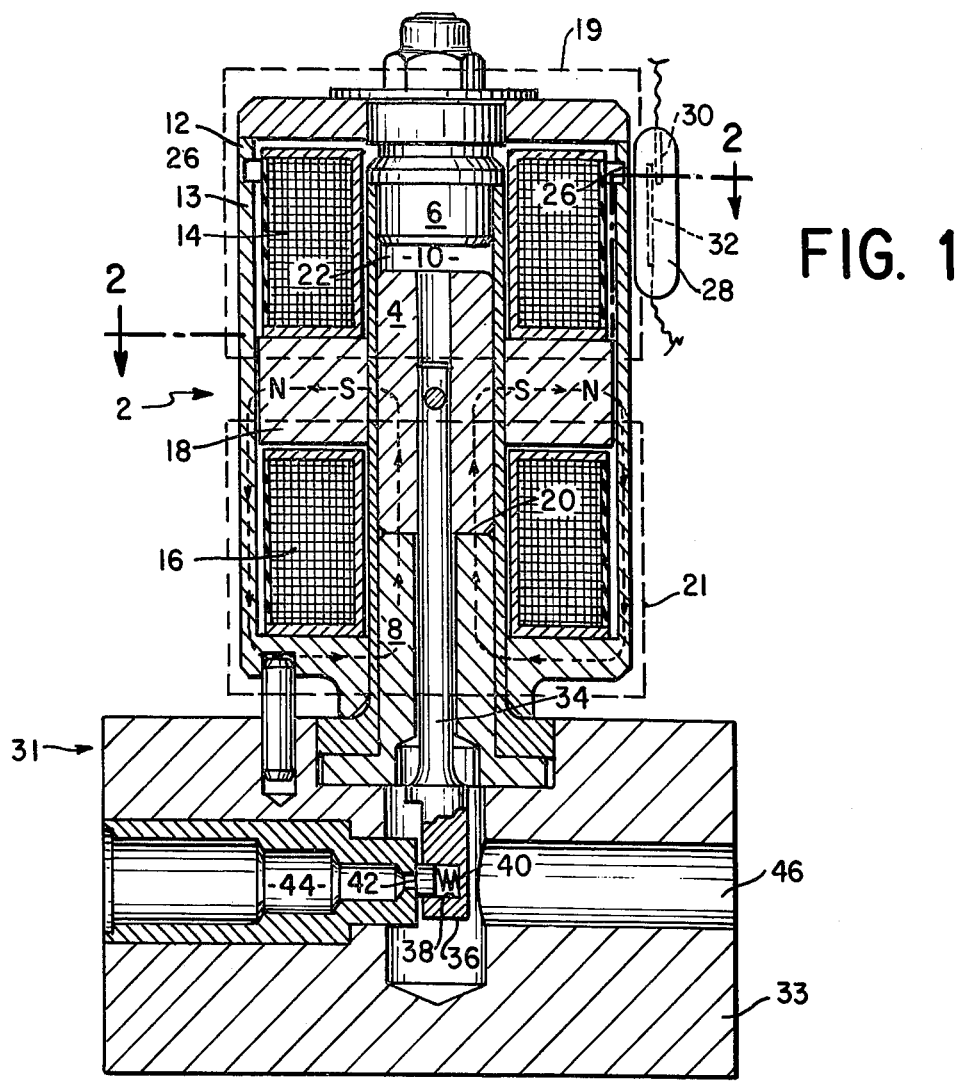
FIG. 1 is a sectional elevation view of the preferred embodiment of the invention.
Figure 2:
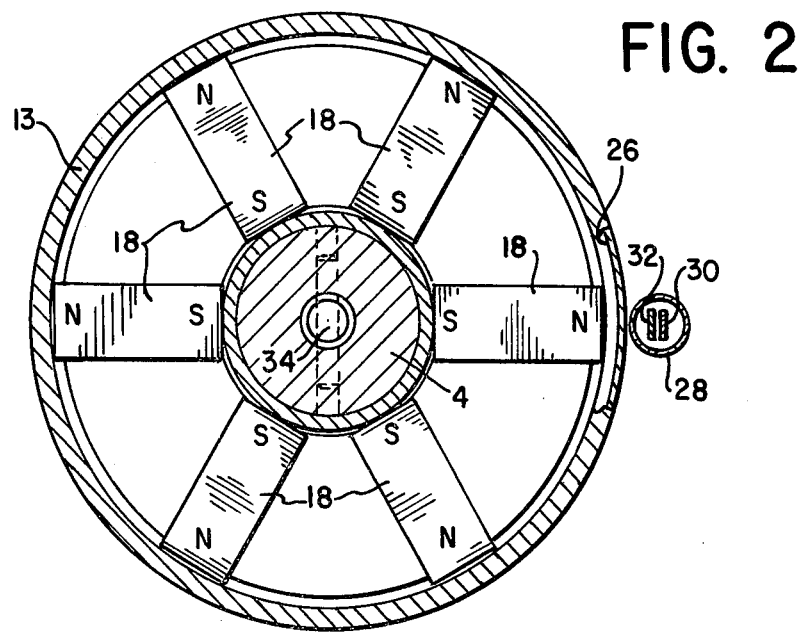
FIG. 2 is a sectional view taken through the line 2—2 of FIG. 1.

Referring now to FIG. 1, a pulse latching solenoid 2 has a plunger 4 movable in a channel 10 between two plunger stops 6 and 8 disposed at respective ends of the channel 10. The channel 10 is formed in a solenoid housing 12 which contains two windings 14 and 16 circumscribing the channel 10 at the interfaces of plunger 4 with stops 6 and 8 respectively. Between the windings 14 and 16 there are provided permanent magnets 18, radially distributed about the channel 10 as shown in FIG. 2. The number of permanent magnets employed is not critical and a single magnet of suitable shape may be used to provide the necessary flow of flux.

Rather than use a single annular magnet which is quite expensive when applied to a position indicating pulse latching solenoid, the distribution of a plurality of bar magnets about the plunger channel 10 has been found to be an equally functional and significantly less expensive alternative. Six or seven bar magnets have been found to give adequate results. The bar magnets when placed about the channel 10 mutually repel one another and thereby tend to space themselves at substantially equal angles from one another about the channel 10. A potting compound is then applied to permanently affix the magnets in place.

The housing 12 has outer walls 13 which like the stops 6 and 8 and plunger 4 are made of paramagnetic steel capable of conducting magnetic flux generated by the permanent magnets 18. Any material with paramagnetic properties may be used to form these elements. The pulse latching solenoid therefore includes two magnetic circuits. The upper magnetic circuit 19 comprises the permanent magnets 18, housing walls 13, plunger stop 6, and the plunger 4. The lower magnetic circuit 21 includes the permanent magnets 18, housing walls 13, plunger stop 8 and the plunger 4. Thus, the housing walls 13, permanent magnets 18 and plunger 4 are elements common to both magnetic circuits. The plunger 4 differs from the other common circuit elements which are stationary in that it conducts significant flux through only one of the two circuits at any given time, being movable from one to the other. Thus, when the plunger 4 is in the upper circuit 19 as shown in FIG. 1A thereby completing that circuit, the flow of flux in the lower circuit 21 is substantially interrupted due to a gap 20 (shown closed in FIG. 1) between the plunger 4 and stop 8. Similarly, when the plunger occupies a position in the lower circuit 21 (as shown in FIG. 1) thereby closing the gap 20 and permitting magnetic flux from the permanent magnets 18 to flow therethrough, the flow of flux in the upper circuit 19 is substantially interrupted due to a gap 22 (as shown open in FIG. 1) left by the plunger 4.

When the plunger 4 is in the lower circuit 21 as shown in FIG. 1, flux flows from the north poles N of the permanent magnets 18 to the outer wall 13 of the housing 10, into the stop 8, through the plunger 4 and then back into the permanent magnets 18 at their south poles S. At this time the flow of flux in the upper magnetic circuit 19 which is open at the gap 22 between the plunger 4 and stop 6 is minimal due to the ralatively large reluctance of the gap 22 and for purposes of the invention may be considered inconsequential.

When the plunger is moved from its lowermost position against stop 8 to its uppermost position against stop 6 the flow of flux in the lower circuit 21 is reduced to an insignificant level and flux commences to flow in the upper circuit 19 from the north poles N of the permanent magnets 18 through the outer walls 13 of the housing 12, into the plunger stop 6, across the interface at 22 to the plunger 4, and then back into the south poles S of the permanent magnets 18. The plunger 4 is held in place in the upper circuit 19 by attractive magnetic forces developed between the plunger 4 and stop 6 caused by the unidirectional flow of magnetic flux through both elements of the magnetic circuit 19.

To shift the plunger 4 from one stop to another, the normally deenergized winding proximate to the stop to which the plunger 4 is to be moved is impressed with an electrical pulse of intensity sufficient to cause a transient electromagnetic force to be momentarily exerted on the plunger 4 thereby attracting it to that stop. For example, when the plunger 4 is in its lowermost position against stop 8 and it is desired to raise it to its uppermost position against stop 6, both windings 14 and 16 being normally deenergized, a pulse is impressed upon winding 14. As the current in winding 14 increases from a zero value, the change in current in the winding produces an electromagnetic field in the plunger 4 and stop 6. The flux lines necessary to establish this field are switched from the lower permanent magnet circuit 21 to the upper winding 14 without changing the flux density of the permanent magnets 18. That is, the number of flux lines added to the uppermost circuit 19 is substracted from the lowermost one 21. When the current in winding 14 reaches a level where the original flux lines are substantially equally divided between the lower permanent magnet circuit 21 and the upper electromagnetic-permanent magnet circuit 19, the opposing forces exerted on the plunger 4 from both magnetic circuits are in equilibrium. As the current increases in winding 14 and the flux lines continue to shift from the lower magnetic circuit 21 to the upper circuit 19, the plunger 4 is accelerated toward stop 6, closing the gap 22 and opening the gap 20. Once the plunger 4 reaches the stop 6 the permanent magnetic forces generated by the flux lines in the upper circuit 19 which then is complete, are sufficient to hold the plunger 4 in place with substantially the same intensity as the forces which previously held the plunger 4 against the lower stop 8.

By alternately applying electrical pulses to windings 14 and 16, the plunger 4 may be shuttled up and down simultaneously shifting the magnetic field between the upper magnetic circuit 19 and the lower one 21.

It is desirable to determine if the plunger 4 has in fact shifted position upon application of an electrical pulse to the appropriate winding. Often, due to the construction of the solenoid, and/or the manner in which it is applied, the plunger is not visible. For example, where the moving plunger is inside a pressurized enclosure and the motion of the plunger requires positive confirmation it is essential that confirmation be achieved without penetration of the pressure wall. Applications of this type occur in conjunction with on-off fluid flow devices wherein plunger motion controls the flow of the pressurized media. Furthermore, in applications where the apparatus of which the solenoid is a part is to be left unattended for automatic actuation and return of the solenoid plunger upon occurrence of a random event, it is desirable to determine at some future time whether the plunger did in fact actuate upon electrical command. Since the electrical command pulse is applied only momentarily, establishment of a sustained magnetic field in the energized circuit depends on actual movement of the plunger 4 into position in that circuit. Thus, the position of the plunger may be sensed by introducing into the flux path of the magnetic circuit into which the plunger is to be shifted, an indicating device sensitive to the presence of a magnetic field. One such device is a magnetically sensitive reed switch.

Substantial flux leakage will occur at a gap in a magnetic circuit provided the gap is small enough so that flux flow is not completely interrupted. An air gap 26 is, therefore, provided in the upper magnetic circuit 19, specifically in the paramagnetic steel housing wall 13. A reed switch 28 is positioned adjacent to the air gap 26. The air gap may be located at any point in the magnetic circuit. However, by forming it in the outer wall, placement of the leakage flux sensing mechanism is facilitated, i.e., the sensor may be mounted external to the solenoid device.

It has been found that the flux leakage gap does not require that the magnetic circuit member in which the gap is formed be completely severed. By placing a groove about the inner wall of the housing leaving a thin layer of paramagnetic material bridging the flux leakage gap, the structural integrity of the solenoid housing may be maintained while furnishing an adequate flux leakage path. THe thin portion of the housing wall defined by the circumferential groove is unable to conduct all of the flux flowing in the magnetic circuit in which the groove is disposed, and is readily saturated by the flow of flux in the circuit. As a result there is a substantial amount of flux leakage bridging the gap 26 external to the thin wall. The flux leakage or overflow which cannot be carried by the saturated thin wall may be sensed by an adjacent magnetically sensitive reed switch.

The reed switch contains a pair of low reluctance, ferromagnetic, slender flattened reeds 30 and 32, hermetically sealed into a glass tube with a controlled atmosphere, in cantilever fashion so that the ends align and overlap leaving a small gap between them. Since the reeds 30 and 32 are ferromagnetic, their extreme ends assume opposite magnetic polarity when subjected to a magnetic field. When the magnetic flux density of the field is sufficient, the attractive forces of the opposing magnetic poles overcome the inherent stiffness of the reeds causing then to flex toward one another thereby making electrical contact.

By placing the reed switch 28 adjacent to the gap 26, permitting the leakage flux to pass therethrough, the reed switch contacts 30 and 32 may be caused to close in the presence of a magnetic field in the upper magnetic circuit 19 and to open when the magnetic field is switched away from the gap and into the lower circuit 21. By connecting the reed switch in a conventional manner to a suitable indicator (not shown) the position of the plunger may be discerned.

It is not necessary that the reed switch 28 be immediately proximate to the plunger 4, the only requirement being that the reed switch be sufficiently close to the flux leakage gap 26 to sense the magnetic field in the circuit. Depending on the strength of the permanent magnets 18 and the configuration of the components comprising the magnetic circuit 19, the flux leakage gap and reed switch sensor may be remotely located from the moving plunger 4.

Furthermore, should the plunger 4 fail to shift upon application of an electrical pulse to the appropriate winding, an indication of the failure can be registered for future observation. Thus, it is not necessary that the operator observe the indicator at the time the plunger is supposed to occupy a position to which it is to shift on command in order to determine whether the command was obeyed. The indication is generated by the momentary electromagnetic field set up in the magnetic circuit which includes the winding to which the electrical pulse is applied. When the electrical pulse is applied to that winding, a transient electromagnetic flux causes the reed switch to close. For example, when the winding 14 of FIG. 1 is momentarily energized, the reed switch 28 of FIG. 1 closes to assume the position of the reed switch 28 as shown in FIG. 1A. After decay of the pulse and upon failure of the plunger 4 to shift into the magnetic circuit, the reed switch returns to its normally open position as shown in FIG. 1. Suitable logic circuitry 29 or 29a of a conventional type employing relays or solid state switching devices may be used to record the momentary closure of the reed switches 28 or 28a respectively and their immediate reopening thereby indicating failure of the plunger to shift upon application of the electrical pulse to the winding.

Also, in an application having a duty cycle wherein pulses are alternately applied to the two windings to shift the plunger 4 between at least two positions, the solenoid need not be observed during any particular phase of the cycle in order to detect a prior failure to actuate on command. Instead, the failure indicator may be observed at any later time to determine if the plunger has consistently shifted on command. This indication is not possible in mechanisms which depend upon relative movement between a magnetized plunger and a reed switch proximate thereto. There, observation of the reed switch actuated indicator must be made during the portion of the cycle in which the plunger is required to occupy a desired position to verify movement to that position.

As shown in FIG. 1, a pulse latching solenoid can be used to operate a fluid flow control valve. The valve 31 includes a housing 33 which is bored to receive a rod 34 affixed to the solenoid plunger 4. At the end of the rod 34 is a seal disk holder 36 which supports a seal disk 38. A spring 40 urges the seal disk 38 against an opening 42 in a valve outlet passage 44 formed in the valve housing 33. The spring 40 is assisted in keeping the valve closed by the pressure exerted by the fluid against the seal disk holder 36 and seal disk 38. The greater the fluid pressure, the greater the frictional sealing force as is desired. The valve 31 is closed to fluid flow when the plunger 4 is positioned against the lower stop 8 as shown in FIG. 1. When a pulse is applied to the winding 14, the plunger 4 shifts upwardly causing the rod 34 and seal disk 38 to rise thereby allowing fluid to flow through a valve inlet 46, under the seal disk holder 36, and through a valve outlet passage 44 formed in the housing 33. By alternately applying pulses to the windings 14 and 16, the valve 31 may be opened and closed to allow intermittent fluid flow. A conventional sensor (not shown) may be used to signal a predetermined fluid level of fluid pressure in a vessel and control administration of electrical pulses to the solenoid windings to maintain or limit the fluid level or pressure. Failure of the valve to operate during any cycle may be registered by an indicator wired to show momentary closure of the reed switch 28 and absence of plunger movement as herebefore described.

It is to be noted that the use of a reed switch with permanent magnet circuitry to merely indicate plunger position as disclosed herein need not be limited to apparatus utilizing electromagnetic windings to induce motion of a plunger. On the contrary, this method of failure indication may be applied to apparatus wherein motion of a plunger from one magnetic circuit to another is induced by any means, be it mechanical or other, to confirm either plunger movement or position.

In order to attain position position indication at both plunger positions, flux leakage gaps may be formed in both magnetic circuits each with its own respective reed switch sensor as shown in FIG. 1A. Flux leakage would then be provided at the flux leakage gap in each magnetic circuit when the plunger was present in that circuit and the respective reed switch would sense the leakage. In this manner a positive indication of plunger position would always be obtainable due to the presence of leakage flux in one of the two magnetic circuits. By placing the flux leakage gaps close enough to one another while maintaining sufficient isolation such that flux leakage from one circuit does not actuate the sensor for the other circuit, the two sensors may be mounted with appropriate logic circuitry on a single connector or other attaching means.

There are other modifications that may be made to the above-described embodiment by one ordinarily skilled in the art without departing from the spirit and scope of the invention.

What is claimed is:
1. A position indicating solenoid comprising:
   a. a housing,
   b. a continuous source of magnetic flux mounted in said housing,
   c. first and second alternately activated magnetic circuits contained in said housing and linked to said continuous source of magnetic flux, each of said circuits having a common magnetic member movably mounted in said housing between said first and second magnetic circuits to alternately close one of said circuits while opening the other, such movement of said common member causing the flux flow to move between said first and second circuits with said common member when said first circuit is closed by said common movable member,
   d. means included in said first magnetic circuit permitting flux leakage upon activation of said circuit, and
   e. sensing means mounted proximate to said flux leakage means responsive to said leakage flux for determining the position of said common movable member.
2. A position indicating solenoid as in claim 1 wherein said continuous source of magnetic flux comprises a plurality of bar magnets.
3. A position indicating solenoid as in claim 1 wherein said sensing means comprises a magnetically responsive reed switch.
4. A position indicating solenoid as in claim 1 further comprising means responsive to a command electric current for producing an electromagnetic field in at least one of said magnetic circuits to cause movement of said common member between said first and second magnetic circuits, said sensing means being additionally responsive to said electromagnetic field for indicating application of said command signal.
5. A position indicating solenoid as in claim 1 wherein said first magnetic circuit includes a part of said housing, said housing part having a flux gap which is saturated by the flow of flux in said first magnetic circuit causing flux leakage about said gap.
6. A position indicating solenoid as in claim 5 further comprising means responsive to a command electric current for producing an electromagnetic field in said first magnetic circuit to cause movement of said common movable member from said second magnetic circuit to said first magnetic circuit, said sensing means being additionally responsive to said electromagnetic field for indicating application of said command signal.
7. A position indicating solenoid as in claim 5, said housing part having a groove which impedes the flux flow thereby causing flux leakage when said first magnetic circuit is activated.
8. A position indicating solenoid as in claim 7 wherein said movable member includes paramagnetic plunger means and further comprising means responsive to a command electric current for producing an electromagnetic field in said first magnetic circuit to cause movement of said common member from said second magnetic circuit to said first magnetic circuit, said sensing means being additionally responsive to said electromagnetic field for indicating application of said command signal.
9. In a solenoid having a paramagnetic plunger movable in response to application of a momentary magnetic flux between two positions, said plunger completing a magnetic circuit at one of said two positions, thereby causing to exist in said magnetic circuit a continuous flux having a magnitude greater than the magnitude of flux in said circuit when said plunger is in the other of said two positions, a method of confirming movement of said plunger to said one position comprising:
   sensing a leakage of said momentary flux, and
   in response to said momentary flux leakage, sensing whether there is continuous leakage of said greater magnitude flux in said magnetic circuit to determine whether said circuit has been closed by movement of said plunger.
10. In a solenoid having a paramagnetic plunger movable between first and second positions, said plunger closing a first magnetic circuit and opening a second magnetic circut when moved from said second position to said first position in response to application of a first momentary flux thereby causing to exist in said first magnetic circuit a continuous flux having a magnitude greater than the magnitude of flux in said first magnetic circuit when said plunger is in said second magnetic circuit and closing said second magnetic circuit and opening said first magnetic circuit when moved from said first position to said second position in response to application of a second momentary flux thereby causing to exist in said second magnetic circuit a continuous flux having a magnitude greater than the magnitude of flux in said second magnetic circuit when said plunger is in said first magnetic circuit, a method of confirming movement of said plunger from one of said first and second positions to the other of said first and second positions comprising:
   sensing a leakage of one of said first and second momentary fluxes, in response to the first of said momentary fluxes, sensing whether there is continuous flux leakage in said first magnetic circuit to determine whether said first circuit has been closed by movement of said plunger thereinto, and in response to the second of said momentary fluxes, sensing whether there is continuous flux leakage in said second magnetic circuit to determine whether said second circuit has been closed by movement of said plunger thereinto.

* * * * *